US008803854B2

(12) United States Patent
Li et al.

(10) Patent No.: US 8,803,854 B2
(45) Date of Patent: Aug. 12, 2014

(54) GATE DRIVER AND LIQUID CRYSTAL DISPLAY USING THE SAME

(75) Inventors: Ching-Lin Li, Penghu County (TW); Yu-Chun Tsai, Chiayi County (TW); Chao-Ching Hsu, Taoyuan County (TW); Shih-Yuan Su, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 993 days.

(21) Appl. No.: 12/790,994

(22) Filed: Jun. 1, 2010

(65) Prior Publication Data

US 2011/0248977 A1 Oct. 13, 2011

(30) Foreign Application Priority Data

Apr. 7, 2010 (TW) ............................... 99110754 A

(51) Int. Cl.
*G06F 3/038* (2013.01)

(52) U.S. Cl.
USPC .............................. 345/204; 345/214; 345/87

(58) Field of Classification Search
USPC ........... 345/204, 690, 214, 55, 76, 82, 83, 87, 345/98, 100, 103
See application file for complete search history.

(56) References Cited

U.S. PATENT DOCUMENTS 5,621,439 A * 4/1997 Okada et al. .................. 345/211
6,124,840 A * 9/2000 Kwon ........................... 345/100
6,842,200 B1 1/2005 Su et al.
7,079,123 B2 * 7/2006 Shino et al. ................... 345/204
7,123,234 B2 * 10/2006 Moon et al. ...................... 345/98
7,221,350 B2 * 5/2007 Wu et al. .......................... 345/92
7,463,230 B2 * 12/2008 Lee ................................ 345/87
7,463,254 B2 * 12/2008 Shino et al. ................... 345/204
7,499,141 B2 3/2009 Lai
7,868,988 B2 * 1/2011 Kim et al. ..................... 349/149
8,149,230 B2 * 4/2012 Lee et al. ...................... 345/211
2003/0025687 A1 * 2/2003 Shino et al. ................... 345/204
2004/0135956 A1 * 7/2004 Kim et al. ..................... 349/148
2005/0237812 A1 10/2005 Chang
2006/0114216 A1 * 6/2006 Shim ............................ 345/100
2008/0129717 A1 6/2008 Lee et al.

FOREIGN PATENT DOCUMENTS

CN 1873483 12/2006

OTHER PUBLICATIONS

"First Office Action of China Counterpart Application", issued on Oct. 31, 2011, p. 1-p. 4.

* cited by examiner

*Primary Examiner* — Jason Mandeville
(74) *Attorney, Agent, or Firm* — Jianq Chyun IP Office

(57) ABSTRACT

A gate driver and a liquid crystal display using the same are provided. The gate driver includes a scan signal generating unit and a compensation unit. The scan signal generating unit has a plurality of output channels, and is used for sequentially outputting a scan signal through the output channels according to a basic clock and a start pulse. The compensation unit is coupled to the scan signal generating unit, and used for compensating the total resistance of each of the output channels, and sequentially receiving and transmitting the scan signal to a display panel.

9 Claims, 9 Drawing Sheets

GATE DRIVER AND LIQUID CRYSTAL DISPLAY USING THE SAME

CROSS-REFERENCE TO RELATED APPLICATION

This application claims the priority benefit of Taiwan application serial no. 99110754, filed on Apr. 7, 2010. The entirety the above-mentioned patent application is hereby incorporated by reference herein and made a part of specification.

BACKGROUND OF THE INVENTION

1. Field of the Invention

The invention relates generally to a flat panel display technology and more particularly, to a gate driver having a resistance compensation function and a liquid crystal display using the gate driver.

2. Description of Related Art

In recent years, with great advance in the semiconductor technique, portable electronic devices and flat panel displays (FPDs) have been rapidly developed. Among the various types of flat panel displays, liquid crystal displays (LCDs) have become the mainstream among the display products mainly due to their advantages such as low operating voltage, lack of harmful radiation, light weight, and small footprint.

Generally speaking, as shown in FIG. 1, when a conventional gate driver 103 is employed in a high resolution display panel 101, since a wiring distance from each of the output channels OUT of the gate driver 103 to the display panel 101 is different (e.g., a wiring distance to the region A of the display panel 101 is shorter than a wiring distance to the regions B and C), a layout resistance variation between each of the output channels OUT of the gate driver 103 and the display panel 101 is overly large. For example, a smallest layout resistance is approximately 82Ω, whereas a largest layout resistance is approximately 1021Ω.

Accordingly, based on each of the output channels OUT of the gate driver 103 having a same loading on the display panel 101, and since the layout resistance variation between each of the output channels OUT of the gate driver 103 and the display panel 101 is overly large (e.g., may be a difference of several hundred ohms), therefore a scan signal outputted by each of the output channels OUT of the gate driver 103 may have too large a disparity.

Consequently, in condition of the display panel 101 is a normally black type, when the gate driver 103 outputs scan signals having large variations through all of its output channels OUT to the display panel to turn on all the scan lines (e.g., all the pixels), the display panel 101 does not display an ideal all black image. Rather, a so-called "multi-band phenomenon" may be generated (e.g., the middle region A of the display panel 101 may display the black image, while the regions B and C of the display panel 101 may display a continuous gradient gray image), thereby affecting the quality of images displayed by the display panel 101.

SUMMARY OF THE INVENTION

In view of the foregoing, an aspect of the invention provides a gate driver capable of mitigating the issues set forth in the description of related art.

An aspect of the invention provides a gate driver including a scan signal generating unit and a compensation unit. The scan signal generating unit has a plurality of output channels, and is used for sequentially outputting a scan signal through the output channels according to a basic clock and a start pulse. The compensation unit is coupled to the plurality of output channels, used for compensating a total resistance of each of the output channels, and sequentially receiving and transmitting the scan signal to a display panel.

Another aspect of the invention provides a gate driver including a scan signal generating unit and a compensation unit. The scan signal generating unit has a plurality of output channels, and is used for sequentially outputting a scan signal through the output channels according to a basic clock and a start pulse. The compensation unit is coupled to the plurality of output channels, and the compensation unit includes a switching means and a resistance-supply means. The compensation unit is used for respectively providing a compensation resistance to compensate a total resistance of each of the output channels through the switching means and the resistance-supply means accordance to at least an external configuration signal and/or the scan signal, and sequentially receiving and transmitting the scan signal to a display panel.

Another aspect of the invention provides a liquid crystal display having the aforesaid gate driver.

In summary, by employing the switching means and the resistance-supply means therein, the gate driver according to an embodiment of the invention lowers a layout resistance between each of the output channels of the gate driver and the display panel. Accordingly, a variation of the scan signal outputted by each of the output channels of the gate driver is reduced, and a possibility of the "multi-band phenomenon" occurring on the display panel in the description of the related art is lowered, thereby enhancing the quality of images displayed by the display panel.

It should be noted that the above described general descriptions and following embodiments are only taken as examples and used for illustration, not for limiting the scope of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
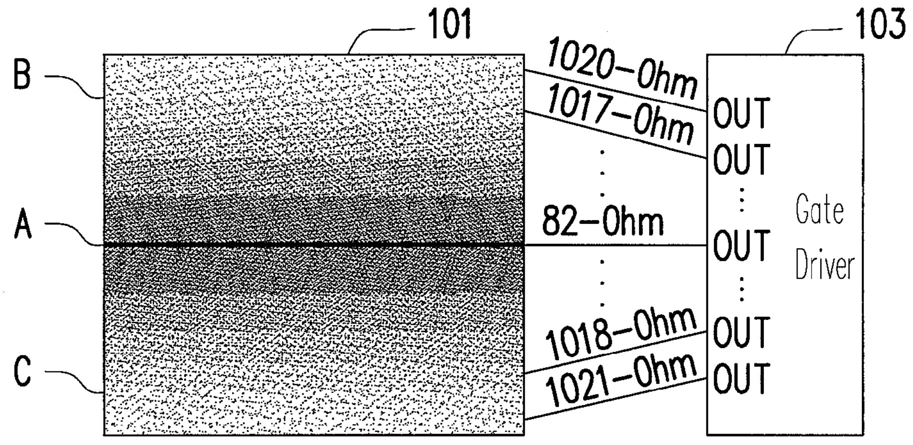
FIG. 1 (RELATED ART)
FIG. 1 is a schematic view illustrating a layout resistance between each of the output channels of a conventional gate driver and a display panel.

Descriptions of the invention are given with reference to the exemplary embodiments illustrated with accompanied drawings, wherein same or similar parts are denoted with same reference numerals. In addition, whenever possible, identical or similar reference numbers stand for identical or similar elements in the figures and the embodiments.

The First Embodiment

Figure 2:
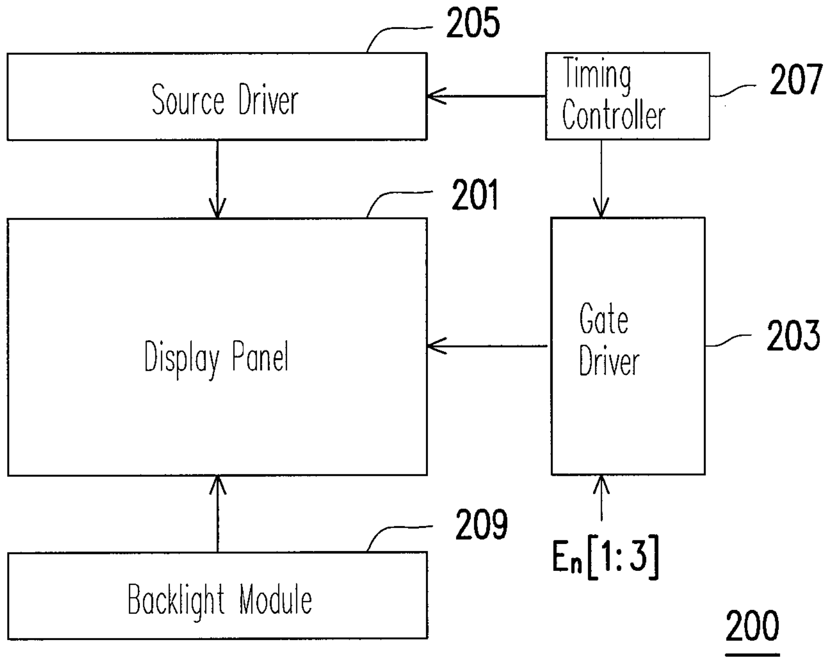
FIG. 2 is a schematic view of a liquid crystal display in accordance with a first embodiment of the invention.

FIG. 2 is a schematic view of a liquid crystal display 200 in accordance with a first embodiment of the invention. Referring to FIG. 2, the liquid crystal display 200 includes a display panel 201, a gate driver 203, a source driver 205, a timing controller 207, and a backlight module 209. In the first embodiment, the backlight module 209 is used for providing a light source required by the display panel 201. The timing controller 207 is used for controlling the operation of the gate driver 203 and the source driver 205, such that the gate driver 203 and the source driver 205 respectively generates scan signals and data signals to drive the display panel 201, whereby the display panel 201 displays images.

According to the description of the related art, since a wiring distance from each of the output channels of the conventional gate driver to the display panel is different, a layout resistance variation between each of the output channels of the gate driver to the display panel is too large (e.g., may be a difference of several hundred ohms). Consequently, in condition of each of the output channels of the gate driver having a same loading on the display panel, the scan signal outputted by each of the output channels of the gate driver may have too large a disparity and thus causing the "multi-band phenomenon".

Accordingly, an embodiment of the invention provides a gate driver having a resistance compensation function, such that a variation of the scan signal outputted by each of the output channels of the gate driver is reduced, and a possibility of the "multi-band phenomenon" occurring on the display panel in the description of the related art is lowered, thereby enhancing the quality of images displayed by the display panel.

Figure 3:
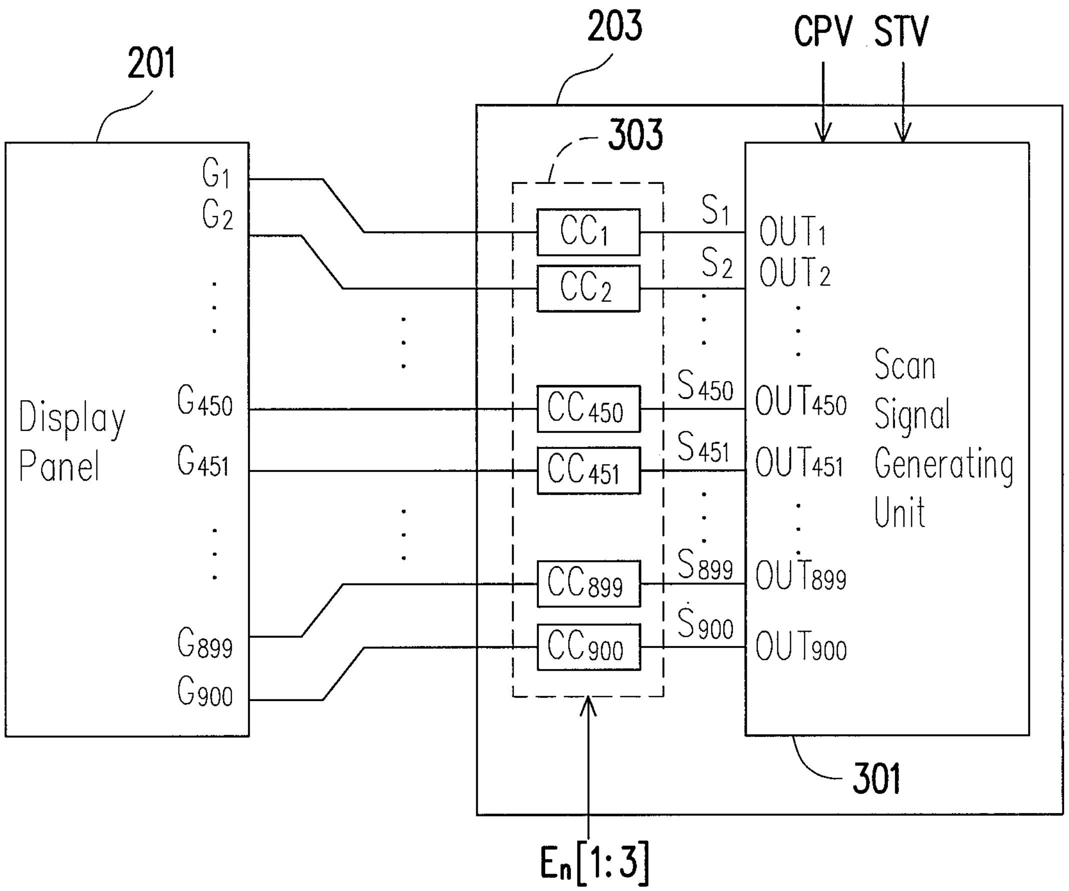
FIG. 3 is a schematic view of a gate driver in accordance with the first embodiment of the invention.

More specifically, FIG. 3 is a schematic view of the gate driver 203 in accordance with the first embodiment of the invention. Referring to FIGS. 2 and 3 together, the gate driver 203 includes a scan signal generating unit 301 and a compensation unit 303. In the first embodiment, the scan signal generating unit 301 has, for example but not limited to, 900 output channels $OUT_1$-$OUT_{900}$. Moreover, a number of the output channels may be determined according to a resolution of the display panel 201. For example, assuming the resolution of the display panel 201 is 1024*768, then this represents the scan signal generating unit may have 768 output channels, and likewise for other scenarios. Generally speaking, the scan signal generating unit 301 is used for sequentially outputting a plurality of scan signals $S_1$-$S_{900}$ through the output channels $OUT_1$-$OUT_{900}$ according to a basic clock CPV and a start pulse STV provided by the timing controller 207. Moreover, the scan signal generating unit 301 may also achieve a bidirectional scanning function according to a direction signal (not drawn) provided by the timing controller 207.

From another perspective, the compensation unit 303 is coupled to the output channels $OUT_1$-$OUT_{900}$ of the scan signal generating unit 301. The compensation unit 303 is used for compensating a total resistance of each of the output channels $OUT_1$-$OUT_{900}$, and sequentially receiving and transmitting the scan signals $S_1$-$S_{900}$ to the display panel 201, thereby turning on each of the scan lines $G_1$-$G_{900}$ in the display panel 201 one by one. In the first embodiment, the compensation unit 303 includes a plurality of compensation circuits $CC_1$-$CC_{900}$ equivalent in quantity to the number of output channels $OUT_1$-$OUT_{900}$ of the scan signal generating unit 301, and respectively corresponding to the output channels $OUT_1$-$OUT_{900}$ of the scan signal generating unit 301. In other words, the compensation circuit $CC_1$ corresponds to the output channel $OUT_1$, the compensation circuit $CC_2$ corresponds to the output channel $OUT_2$, and likewise for other compensation circuits.

Figure 4:
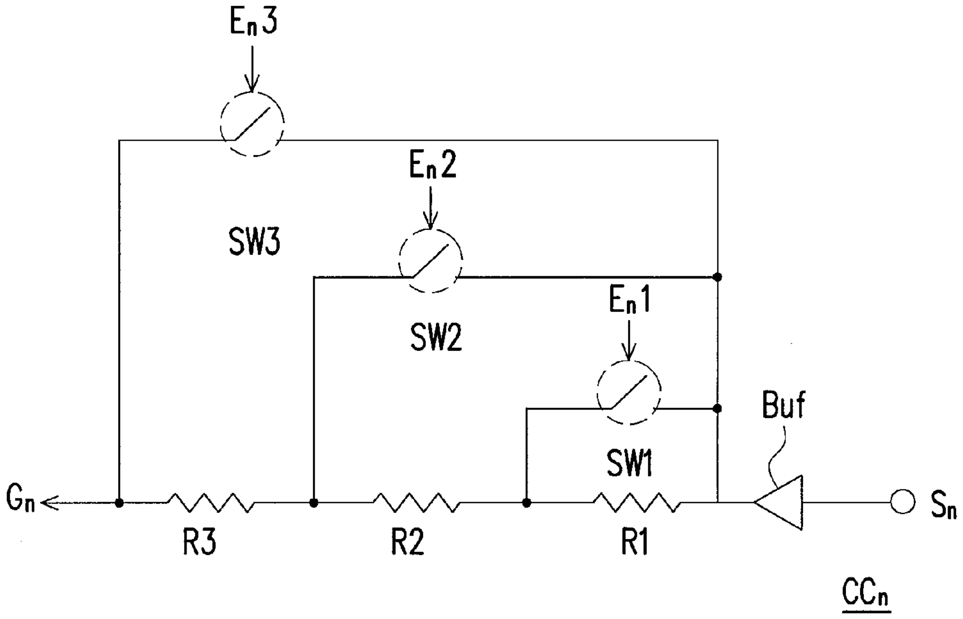
FIG. 4 is a circuit diagram of a compensation circuit in accordance with the first embodiment of the invention.

More specifically, FIG. 4 is a circuit diagram of a compensation circuit $CC_n$ (n=1-900) in accordance with the first embodiment of the invention. Referring to FIGS. 2-4 together, the compensation circuit $CC_n$ (n=1-900) includes a buffer Buf, resistors R1-R3, and switches SW1-SW3. An input terminal of the buffer Buf is used for receiving a corresponding scan signal $S_n$ (n=1-900). A first terminal of the resistor R1 is coupled to an output terminal of the buffer Buf. A first terminal of the resistor R2 is coupled to a second terminal of the resistor R1. A first terminal of the resistor R3 is coupled to a second terminal of the resistor R2, and a second terminal of the resistor R3 is coupled to a corresponding scan line $G_n$ (n=1-900) in the display panel 201.

A first terminal of the switch SW1 is coupled to the first terminal of the resistor R1, a second terminal of the switch SW1 is coupled to the second terminal of the resistor R1, and a control terminal of the switch SW1 is used for receiving an external configuration signal $E_n1$ (n=1-900). A first terminal of the switch SW2 is coupled to the first terminal of the resistor R1, a second terminal of the switch SW2 is coupled to the second terminal of the resistor R2, and a control terminal of the switch SW2 is used for receiving an external configuration signal $E_n2$ (n=1-900). A first terminal of the switch SW3 is coupled to the first terminal of the resistor R1, a second terminal of the switch SW3 is coupled to the second terminal of the resistor R3, and a control terminal of the switch SW3 is used for receiving an external configuration signal $E_n3$ (n=1-900).

In the first embodiment, a resistance of each of the resistors R1-R3 may be set according to an actual design requirement. However, for ease of description, the resistance value of each of the resistors R1-R3 is exemplarily assumed to be 0.5Ω, although the invention should be construed as limited thereto. According to a logic state (see Table 1 below) of the external configuration signals $E_n1$-$E_n3$, the compensation circuit $CC_n$ may provide different resistances to the corresponding output channel $OUT_n$ (e.g., compensating the total resistance of the output channel $OUT_n$).

TABLE 1

| $E_n1$ | $E_n2$ | $E_n3$ | Compensation Resistance |
|---|---|---|---|
| 0 | 0 | 0 | 1.5 Ω |
| 1 | 0 | 0 | 1 Ω |
| 0 | 1 | 0 | 0.5 Ω |
| 0 | 0 | 1 | 0 Ω |

According to Table 1 above, the compensation circuit $CC_n$ may provide 1.5Ω, 1Ω, 0.5Ω, or 0Ω of compensation resistance to the corresponding output channel $OUT_n$. Consequently, after the total resistance of each of the output channels $OUT_n$ has been compensated by the corresponding compensation circuit $CC_n$, the changes generated are presented in Table 2 below.

TABLE 2

| | Compensation Resistance = 0 Ω | Compensation Resistance = 0.5 Ω | Compensation Resistance = 1 Ω | Compensation Resistance = 1.5 Ω |
|---|---|---|---|---|
| $OUT_1$ | 1020.01 Ω | 1020.01 Ω | 1020.01 Ω | 1021.01 Ω |
| $OUT_2$ | 1017.93 Ω | 1018.92 Ω | 1019.42 Ω | 1019.92 Ω |
| $OUT_3$ | 1015.84 Ω | 1017.84 Ω | 1018.84 Ω | 1019.84 Ω |
| — | — | — | — | — |
| — | — | — | — | — |
| $OUT_{255}$ | 489.66 Ω | 743.66 Ω | 870.66 Ω | 997.66 Ω |
| — | — | — | — | — |
| — | — | — | — | — |
| $OUT_{450}$ | 82.59 Ω | 531.59 Ω | 756.09 Ω | 980.59 Ω |
| $OUT_{451}$ | 82.3 Ω | 531.30 Ω | 755.8 Ω | 980.3 Ω |
| — | — | — | — | — |
| $OUT_{675}$ | 550.2 Ω | 775.21 Ω | 887.71 Ω | 1000.21 Ω |
| — | — | — | — | — |
| $OUT_{898}$ | 1014.9 Ω | 1016.90 Ω | 1017.90 Ω | 1018.90 Ω |
| $OUT_{899}$ | 1017.3 Ω | 1018.30 Ω | 1018.80 Ω | 1019.30 Ω |
| $OUT_{900}$ | 1021.2 Ω | 1021.20 Ω | 1021.20 Ω | 1021.20 Ω |

Figure 5:
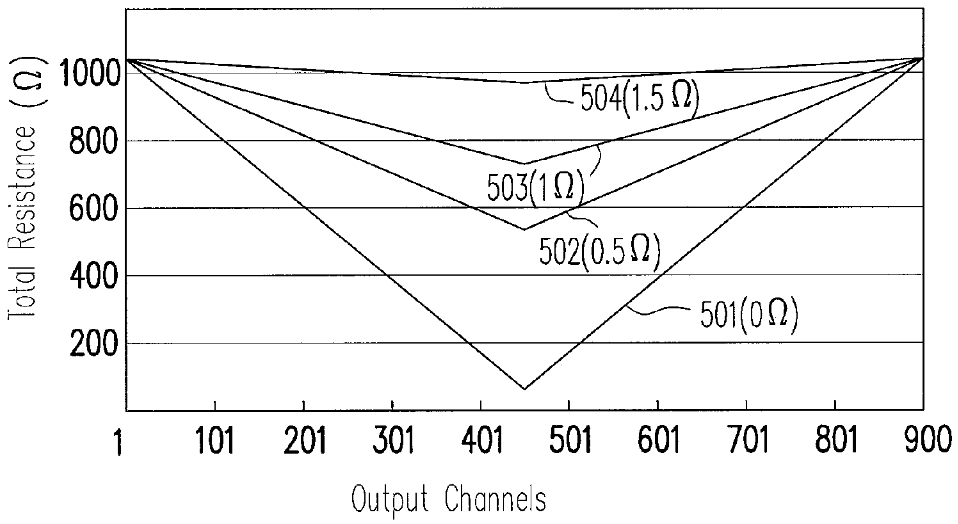
FIG. 5 is a schematic diagram illustrating the compensation of a total resistance of each of the output channels of the gate driver according to the first embodiment by a corresponding compensation circuit.

As shown in Table 2 above, when the total resistances of the output channels $OUT_n$ are not compensated by the corresponding compensation circuits $CC_n$, a largest variation of the total resistances is up to several hundred ohms (e.g., 1021.2Ω-82.59Ω), but once the total resistances of the output channel $OUT_n$ are compensated by the corresponding compensation circuits $CC_n$, the variation is gradually reduced as the compensation resistance increases (e.g., 0Ω→0.5Ω→1Ω→1.5Ω, or even higher), it can be clearly seen as illustrated by curves 501-504 in FIG. 5 according to the numerical values in Table 2.

Therefore, before product shipment of the liquid crystal display 200 according to the first embodiment, merely the logic states of the external configuration signals $E_n$1-$E_n$3 received by each of the compensation circuits $CC_n$ need to be set. Accordingly, the layout resistance variation between each of the output channels $OUT_n$ of the gate driver 203 and the display panel 201 may be drastically reduced (e.g., may only be tens of ohms left). Consequently, based on each of the output channels $OUT_n$ of the gate driver 203 having a same loading on the display panel 201, the scan signal $S_n$ outputted by each of the output channels $OUT_n$ of the gate driver 203 is substantially the same or similar.

Accordingly, in condition of the display panel 201 is the normally black/white type, when the gate driver 203 outputs the same or similar scan signals $S_1$-$S_{900}$ through all the output channels $OUT_1$-$OUT_{900}$ to the display panel 201 to turn on all the scan lines $G_1$-$G_{900}$ (e.g., all the pixels), the display panel 201 can display the ideal all black/white image, and the "multi-band phenomenon" depicted in the description of the related arts is not generated. Therefore, the compensation unit 303 according to the first embodiment not only lowers the possibility of the "multi-band phenomenon" from occurring on the display panel 201, but the quality of images displayed by the display panel 201 may also be enhanced.

The Second Embodiment

Figure 6:
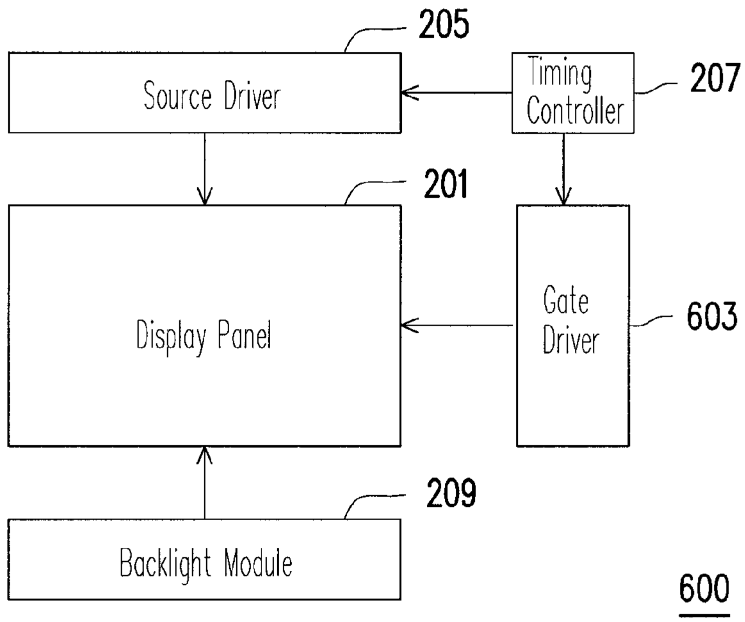
FIG. 6 is a schematic view of a liquid crystal display in accordance with a second embodiment of the invention.
Figure 7:
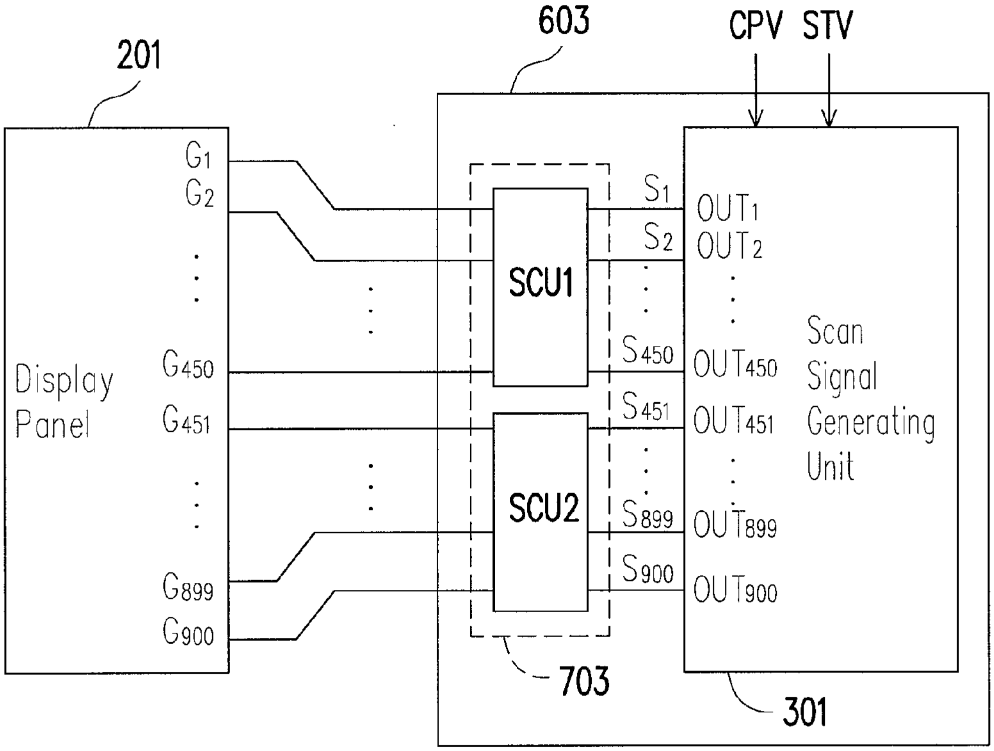
FIG. 7 is a schematic view of a gate driver in accordance with the second embodiment of the invention.

FIG. 6 is a schematic view of a liquid crystal display 600 in accordance with a second embodiment of the invention. FIG. 7 is a schematic view of a gate driver 603 in accordance with the second embodiment of the invention. Referring to FIGS. 2-3 and 6-7 together, a difference between the liquid crystal displays 200 and 600 is in the dissimilar structures of the compensation units 303 and 703 in the gate drivers 203 and 603, although the gate driver 603 achieves similar technical effects of the gate driver 203.

In the second embodiment, a compensation unit 703 includes two sub-compensation units SCU1 and SCU2. The sub-compensation unit SCU1 is coupled to a portion of the output channels of the scan signal generating unit 301, for example the output channels $OUT_1$-$OUT_{450}$. The sub-compensation unit SCU2 is coupled to a remaining portion of the output channels of the scan signal generating unit 301, that is the output channels $OUT_{451}$-$OUT_{900}$.

Figure 8:
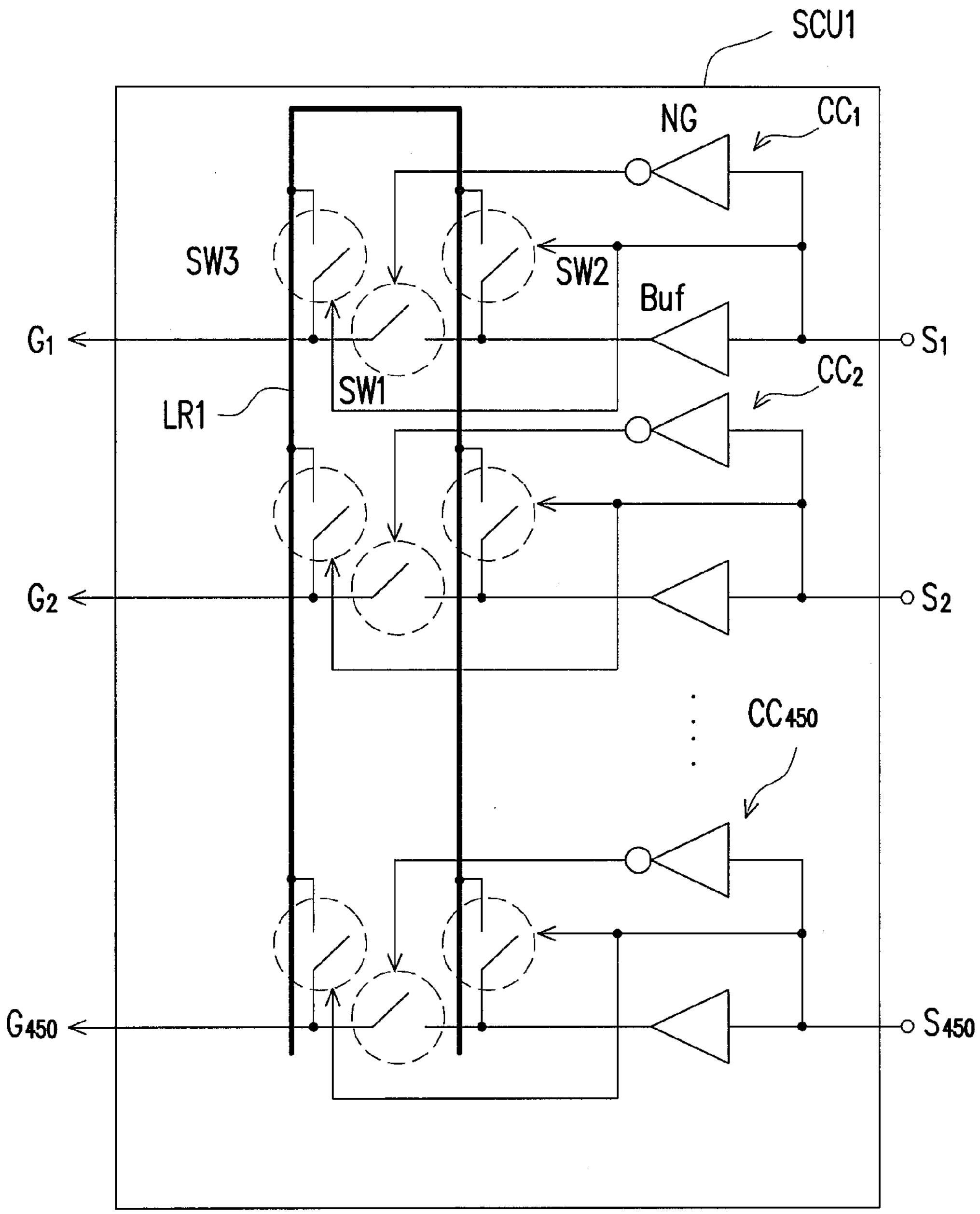
FIGS. 8 and 9 are schematic views respectively illustrating two sub-compensation units in accordance with the second embodiment of the invention.
Figure 9:
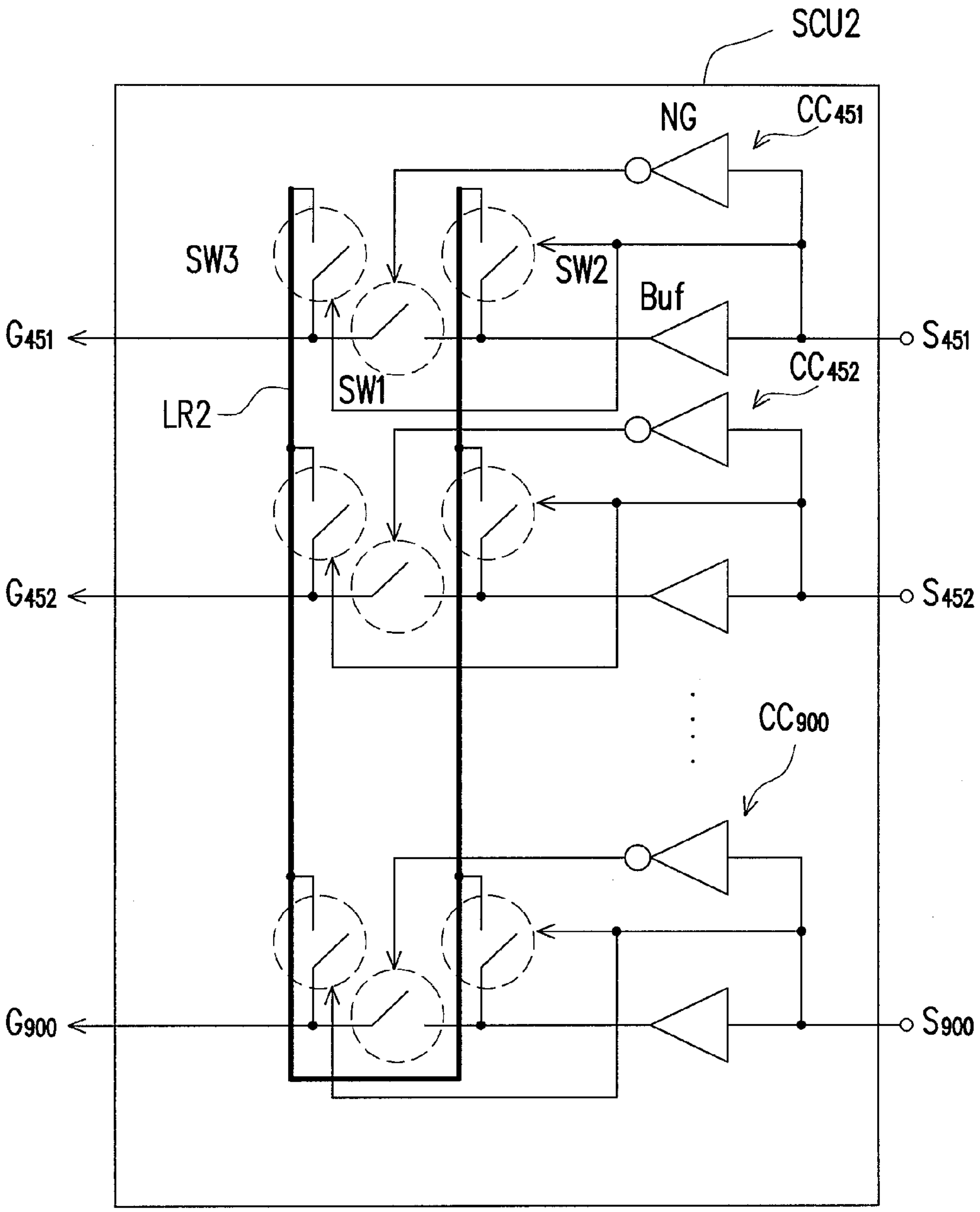

More specifically, FIGS. 8 and 9 respectively illustrate schematic views of the sub-compensation units SCU1 and SCU2 in accordance with the second embodiment of the invention. Referring to FIGS. 8 and 9 together, the sub-compensation unit SCU1 includes a line resistance LR1 and a plurality of compensation circuits $CC_1$-$CC_{450}$ equivalent in quantity to the output channels $OUT_1$-$OUT_{450}$. The sub-compensation unit SCU2 includes a line resistance LR2 and a plurality of compensation circuits $CC_{451}$-$CC_{900}$ equivalent in quantity to the output channels $OUT_{451}$-$OUT_{900}$. Moreover, the resistance values of the line resistances LR1 and LR2 are substantially the same, which may be determined according to an actual design need.

In the second embodiment, the compensation circuits $CC_1$-$CC_{450}$ are respectively corresponding to the output channels $OUT_1$-$OUT_{450}$ of the scan signal generating unit 301. In other words, the compensation circuit $CC_1$ corresponds to the output channel $OUT_1$, the compensation circuit $CC_2$ corresponds to the output channel $OUT_2$, and likewise for other compensation circuits. Similarly, the compensation circuits $CC_{451}$-$CC_{900}$ are respectively corresponding to the output channels $OUT_{451}$-$OUT_{900}$ of the scan signal generating unit 301. In other words, the compensation circuit $CC_{451}$ corresponds to the output channel $OUT_{451}$, the compensation circuit $CC_{452}$ corresponds to the output channel $OUT_{452}$, and likewise for other compensation circuits.

Moreover, in the second embodiment, each of the compensation circuits $CC_n$ (n=1-900) includes a buffer Buf, a NOT gate NG, and switches SW1-SW3.

First, exemplarily taking the compensation circuits $CC_n$ (n=1-450) of the sub-compensation unit SCU1 as an example, an input terminal of the buffer Buf is used for receiving a corresponding scan signal $S_n$ (n=1-450). An input terminal of the NOT gate NG is coupled to the input terminal of the buffer Buf. A first terminal of the switch SW1 is coupled to an output terminal of the buffer Buf, a second terminal of the switch SW1 is coupled to a corresponding scan line $G_n$ (n=1-450) in the display panel 201, and a control terminal of the switch SW1 is coupled to an output terminal of the NOT gate NG. A first terminal of the switch SW2 is coupled to the output terminal of the buffer Buf, a second terminal of the switch SW2 is coupled to the line resistance LR1, and a control terminal of the switch SW2 is coupled to the input terminal of the NOT gate NG. A first terminal of the switch SW3 is coupled to the second terminal of the switch SW1, a second terminal of the switch SW3 is coupled to the line resistance LR1, and a control terminal of the switch SW3 is coupled to the input terminal of the NOT gate NG.

Furthermore, exemplarily taking the compensation circuits $CC_n$ (n=451-900) of the sub-compensation unit SCU2 as an example, the input terminal of the buffer Buf is used for receiving a corresponding scan signal $S_n$ (n=451-900). The input terminal of the NOT gate NG is coupled to the input terminal of the buffer Buf. The first terminal of the switch SW1 is coupled to the output terminal of the buffer Buf, the second terminal of the switch SW1 is coupled to a corresponding scan line $G_n$ (n=451-900) in the display panel 201, and the control terminal of the switch SW1 is coupled to the output terminal of the NOT gate NG. The first terminal of the switch SW2 is coupled to the output terminal of the buffer Buf, the second terminal of the switch SW2 is coupled to the line resistance LR2, and the control terminal of the switch SW2 is coupled to the input terminal of the NOT gate NG. The first terminal of the switch SW3 is coupled to the second terminal of the switch SW1, the second terminal of the switch SW3 is coupled to the line resistance LR2, and the control terminal of the switch SW3 is coupled to the input terminal of the NOT gate NG.

According to the description disclosed in the first embodiment above, when the total resistances of the output channels $OUT_n$ are not compensated by the corresponding compensation circuits $CC_n$, the largest variation of the total resistances is up to several hundred ohms. However, once the total resistances of the output channel $OUT_n$ are compensated by the corresponding compensation circuits $CC_n$, the variation is gradually reduced as the compensation resistance increases.

Accordingly, when the scan signal generating unit 301 outputs the scan signal $S_1$ through the output channel $OUT_1$, since the logic state (logic high) of the input terminal of the NOT gate NG of the compensation circuit $CC_1$ is dissimilar to the logic state (logic low) of the output terminal thereof, the switch SW1 is turned off, whereas the switches SW2 and SW3 are turned on. Consequently, the scan signal $S_1$ outputted by the output channel $OUT_1$ is first buffered by the buffer Buf, then subsequently transmitted to the scan line $G_1$ of the display panel 201 through the switch SW2, the line resistance LR1, and the switch SW3, thereby turning on the scan line $G_1$ until the scan signal generating unit 301 outputs the scan signal $S_2$ through the output channel $OUT_2$.

Similarly, when the scan signal generating unit 301 outputs the scan signal $S_2$ through the output channel $OUT_2$, since the logic state (logic high) of the input terminal of the NOT gate NG of the compensation circuit $CC_2$ is dissimilar to the logic state (logic low) of the output terminal thereof, the switch SW1 is turned off, whereas the switches SW2 and SW3 are turned on. Consequently, the scan signal $S_2$ outputted by the output channel $OUT_2$ is first buffered by the buffer Buf, then subsequently transmitted to the scan line $G_2$ of the display panel 201 through the switch SW2, the line resistance LR1, and the switch SW3, thereby turning on the scan line $G_2$ until the scan signal generating unit 301 outputs the scan signal $S_3$ through the output channel $OUT_3$.

Likewise, in a similar way, when the scan signal generating unit 301 outputs the scan signal $S_{450}$ through the output channel $OUT_{450}$, since the logic state (logic high) of the input terminal of the NOT gate NG of the compensation circuit $CC_{450}$ is dissimilar to the logic state (logic low) of the output terminal thereof, the switch SW1 is turned off, whereas the switches SW2 and SW3 are turned on. Consequently, the scan signal $S_{450}$ outputted by the output channel $OUT_{450}$ is first buffered by the buffer Buf, then subsequently transmitted to the scan line $G_{450}$ of the display panel 201 through the switch SW2, the line resistance LR1, and the switch SW3, thereby turning on the scan line $G_{450}$ until the scan signal generating unit 301 outputs the scan signal $S_{451}$ through the output channel $OUT_{451}$.

According to the foregoing description, as a variable n increases in value, a transmission path length on the line resistance LR1 of the scan signal $S_n$ (n=1-450) outputted by the output channel $OUT_n$ (n=1-450) increases. Therefore, for the output channels $OUT_n$ (n=1-450) ordered from small to large by the value of the variable n, the compensation resistance provided by the corresponding compensation circuit (n=1-450) is also ordered from low to high. Consequently, after the total resistance of each of the output channels $OUT_n$ (n=1-450) has been compensated by the corresponding compensation circuit $CC_n$ (n=1-450), the changes presented in Table 2 above are also generated.

On the other hand, when the scan signal generating unit 301 outputs the scan signal $S_{451}$ through the output channel $OUT_{451}$, since the logic state (logic high) of the input terminal of the NOT gate NG of the compensation circuit $CC_{451}$ is dissimilar to the logic state (logic low) of the output terminal thereof, the switch SW1 is turned off, whereas the switches SW2 and SW3 are turned on. Consequently, the scan signal $S_{451}$ outputted by the output channel $OUT_{451}$ is first buffered by the buffer Buf, then subsequently transmitted to the scan line $G_{451}$ of the display panel 201 through the switch SW2, the line resistance LR2, and the switch SW3, thereby turning on the scan line $G_{451}$ until the scan signal generating unit 301 outputs the scan signal $S_{452}$ through the output channel $OUT_{452}$.

Similarly, when the scan signal generating unit 301 outputs the scan signal $S_{452}$ through the output channel $OUT_{452}$, since the logic state (logic high) of the input terminal of the NOT gate NG of the compensation circuit $CC_{452}$ is dissimilar to the logic state (logic low) of the output terminal thereof, the switch SW1 is turned off, whereas the switches SW2 and SW3 are turned on. Consequently, the scan signal $S_{452}$ outputted by the output channel $OUT_{452}$ is first buffered by the buffer Buf, then subsequently transmitted to the scan line $G_{452}$ of the display panel 201 through the switch SW2, the line resistance LR2, and the switch SW3, thereby turning on the scan line $G_{452}$ until the scan signal generating unit 301 outputs the scan signal $S_{453}$ through the output channel $OUT_{453}$.

Likewise, in a similar way, when the scan signal generating unit 301 outputs the scan signal $S_{900}$ through the output channel $OUT_{900}$, since the logic state (logic high) of the input terminal of the NOT gate NG of the compensation circuit $CC_{450}$ is dissimilar to the logic state (logic low) of the output terminal thereof, the switch SW1 is turned off, whereas the switches SW2 and SW3 are turned on. Consequently, the scan signal $S_{900}$ outputted by the output channel $OUT_{900}$ is first buffered by the buffer Buf, then subsequently transmitted to the scan line $G_{900}$ of the display panel 201 through the switch SW2, the line resistance LR2, and the switch SW3, thereby turning on the scan line $G_{900}$ until the scan signal generating unit 301 again outputs the scan signal $S_1$ through the output channel $OUT_1$ (e.g., a next frame period).

According to the foregoing description, as the variable n increases in value, the transmission path length on the line resistance LR2 of the scan signal $S_n$ (n=451-899) outputted by the output channel $OUT_n$ (n=451-900) decreases. Therefore, for the output channels $OUT_n$ (n=451-900) ordered from small to large by the value (e.g., 451-900) of the variable n, the compensation resistance provided by the corresponding compensation circuit $CC_n$ (n=451-900) is conversely ordered from high to low. Consequently, after the total resistance of each of the output channels $OUT_n$ (n=451-900) has been compensated by the corresponding compensation circuit $CC_n$ (n=451-900), the changes presented in Table 2 above are also generated.

It should be noted that, during a mass production process of the liquid crystal display 600 according to the second embodiment, the liquid crystal display 600 merely needs the resistance values of the line resistances LR1 and LR2 determined according to an actual design requirement. Therefore, similar to the first embodiment, the layout resistance variation between each of the output channels $OUT_n$ of the gate driver 603 and the display panel 201 may be drastically reduced (e.g., may only be tens of ohms left). Moreover, compared to the first embodiment, the implementation of the gate driver 603 according to the second embodiment may be easier than the implementation of the gate driver 203 according to the first embodiment.

The Third Embodiment

Figure 10:
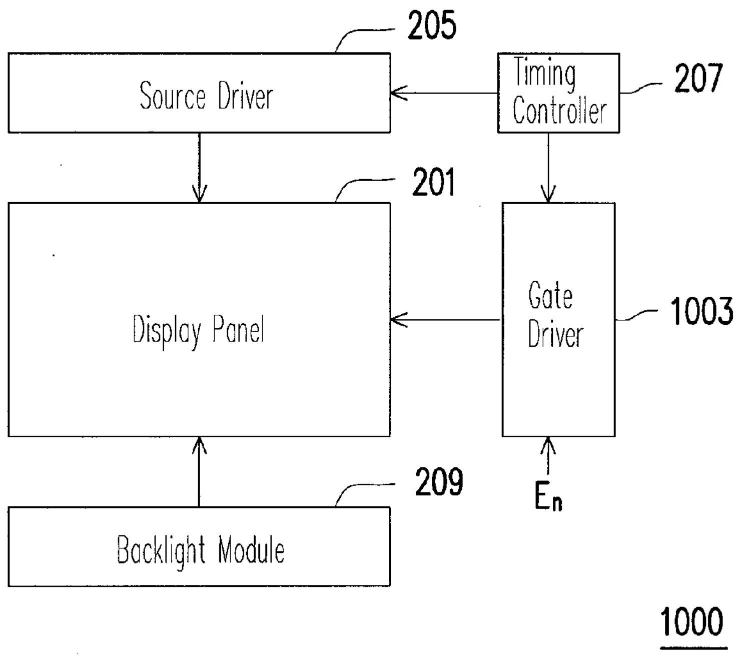
FIG. 10 is a schematic view of a liquid crystal display in accordance with a third embodiment of the invention.
Figure 11:
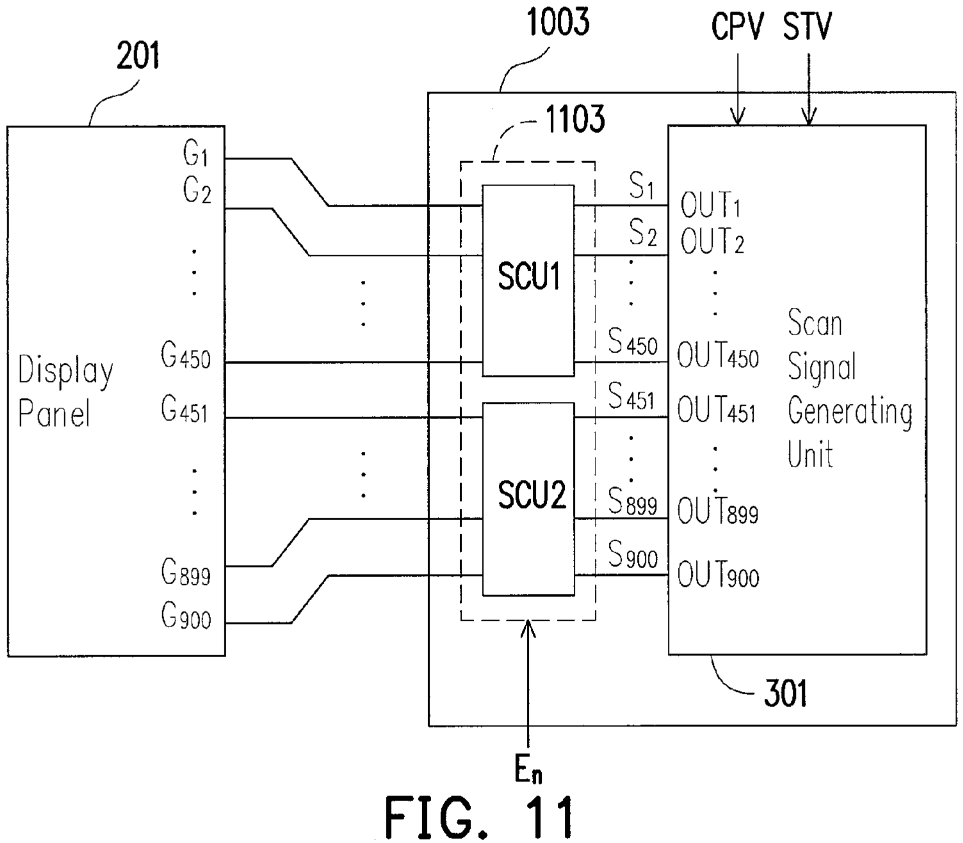
FIG. 11 is a schematic view of a gate driver in accordance with the third embodiment of the invention.

FIG. 10 is a schematic view of a liquid crystal display 1000 in accordance with a third embodiment of the invention. FIG. 11 is a schematic view of a gate driver 1003 in accordance with the third embodiment of the invention. Referring to FIGS. 6-7 and 10-11 together, a difference between the liquid crystal displays 600 and 1000 is in the dissimilar structures of the compensation units 703 and 1103 in the gate drivers 603 and 1003, although the gate driver 1003 achieves similar technical effects of the gate driver 603.

Figure 12:
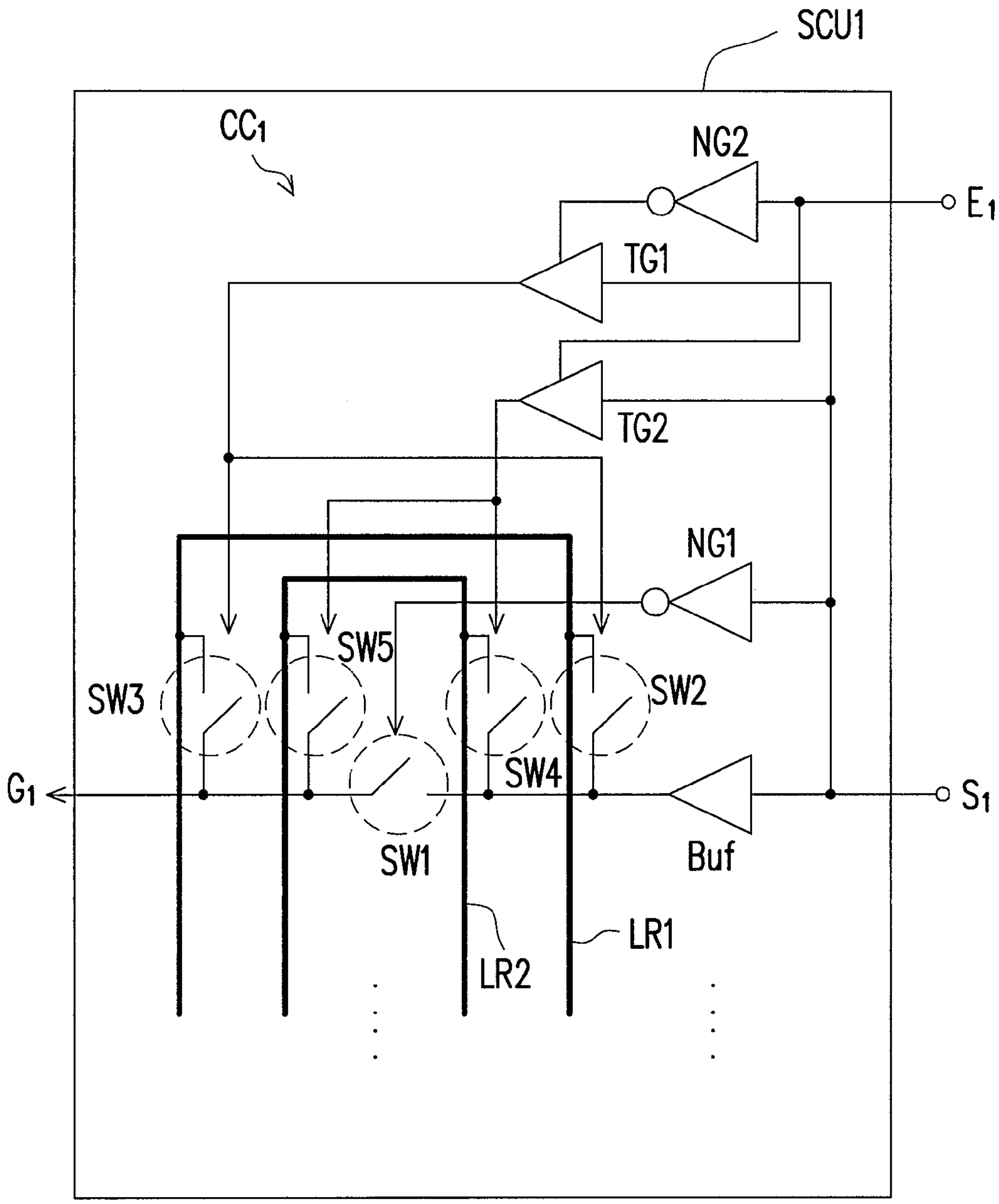
FIGS. 12 and 13 are schematic views respectively illustrating two sub-compensation units in accordance with the third embodiment of the invention.
Figure 13:
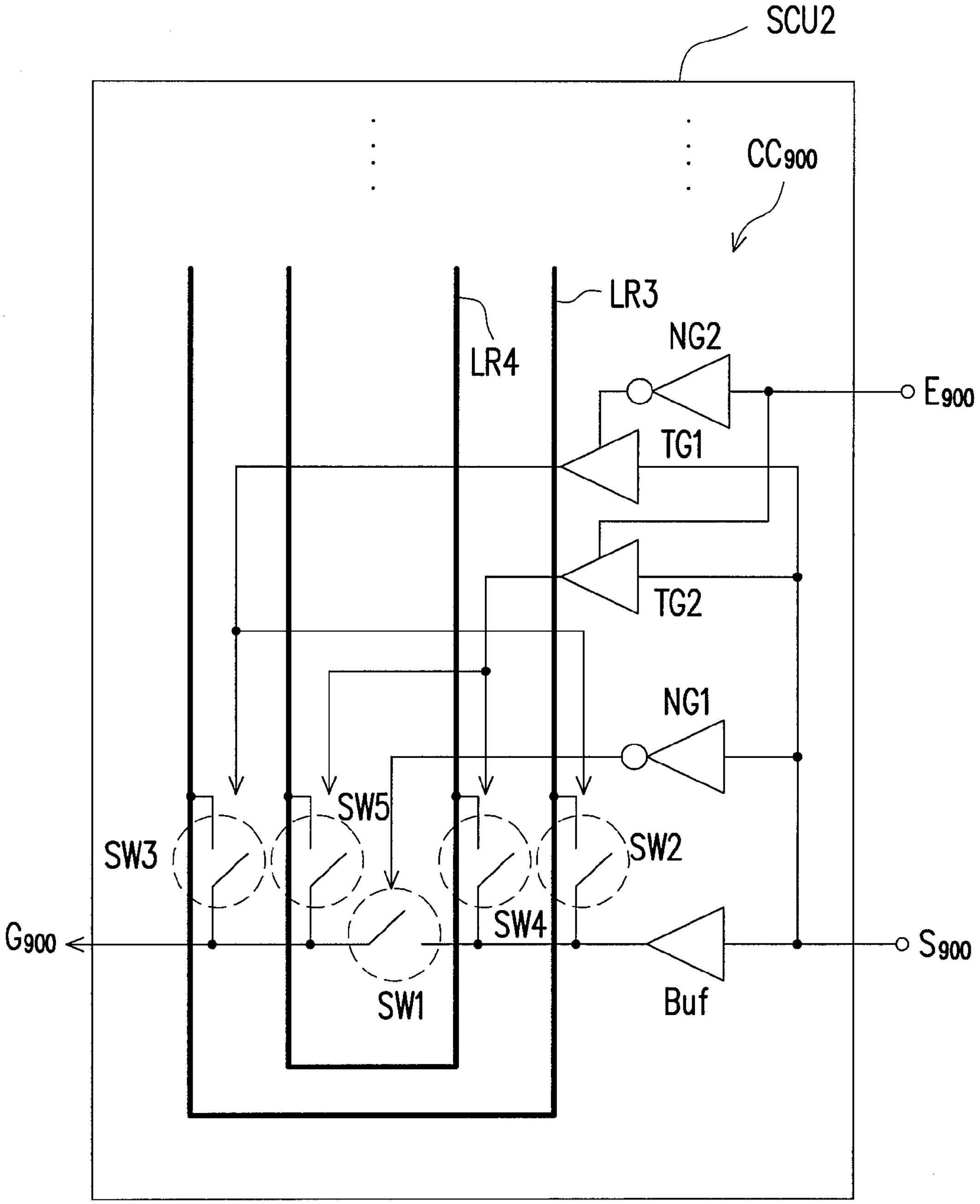

More specifically, FIGS. 12 and 13 respectively illustrate schematic views of the sub-compensation units SCU1 and SCU2 in accordance with the third embodiment of the invention. Referring to FIGS. 12 and 13 together, the sub-compensation unit SCU1 includes line resistances LR1 and LR2, and a plurality of compensation circuits $CC_1$-$CC_{450}$ equivalent in quantity to the output channels $OUT_1$-$OUT_{450}$. The sub-compensation unit SCU2 includes line resistances LR3 and LR4, and a plurality of compensation circuits $CC_{451}$-$CC_{900}$ equivalent in quantity to the output channels $OUT_{451}$-$OUT_{900}$. The resistance values of the line resistances LR1 and LR2 are substantially different, whereas the resistance values of the line resistances LR1 and LR3 are substantially the same. Moreover, the resistance values of the line resistances LR3 and LR4 are substantially different, whereas the resistance values of the line resistances LR2 and LR4 are substantially the same. Furthermore, the line resistance values of the line resistances LR1-LR4 may be determined according to an actual design need.

In the third embodiment, the compensation circuits $CC_1$-$CC_{450}$ are respectively corresponding to the output channels $OUT_1$-$OUT_{450}$ of the scan signal generating unit 301. In other words, the compensation circuit $CC_1$ corresponds to the output channel $OUT_1$, the compensation circuit $CC_2$ corresponds to the output channel $OUT_2$, and likewise for other compensation circuits. Similarly, the compensation circuits $CC_{451}$-$CC_{900}$ are respectively corresponding to the output channels $OUT_{451}$-$OUT_{900}$ of the scan signal generating unit 301. In other words, the compensation circuit $CC_{451}$ corresponds to the output channel $OUT_{451}$, the compensation circuit $CC_{452}$ corresponds to the output channel $OUT_{452}$, and likewise for other compensation circuits.

Moreover, in the third embodiment, each of the compensation circuits $CC_n$ (n=1-900) includes a buffer Buf, NOT gates NG1 and NG2, tri-state gates TG1 and TG2, and switches SW1-SW5.

First, exemplarily taking the compensation circuits $CC_n$ (n=1-450) of the sub-compensation unit SCU1 as an example, an input terminal of the buffer Buf is used for receiving a corresponding scan signal $S_n$ (n=1-450). An input terminal of the NOT gate NG1 is coupled to the input terminal of the buffer Buf. A first terminal of the switch SW1 is coupled to an output terminal of the buffer Buf, a second terminal of the switch SW1 is coupled to a corresponding scan line $G_n$ (n=1-450) in the display panel 201, and a control terminal of the switch SW1 is coupled to an output terminal of the NOT gate NG1. A first terminal of the switch SW2 is coupled to the output terminal of the buffer Buf, and a second terminal of the switch SW2 is coupled to the line resistance LR1. A first terminal of the switch SW3 is coupled to the second terminal of the switch SW1, and a second terminal of the switch SW3 is coupled to the line resistance LR1. A first terminal of the switch SW4 is coupled to the output terminal of the buffer Buf, and a second terminal of the switch SW4 is coupled to the line resistance LR2. A first terminal of the switch SW5 is coupled to the second terminal of the switch SW1, and a second terminal of the switch SW5 is coupled to the line resistance LR2. An input terminal of the NOT gate NG2 is used for receiving an external configuration signal $E_n$ (n=1-450). An input terminal of the tri-state gate TG1 is coupled to the input terminal of the buffer Buf, an output terminal of the tri-state gate TG1 is coupled to the control terminals of the switches SW2 and SW3, and an enable control terminal of the tri-state gate TG1 is coupled to an output terminal of the NOT gate NG2. An input terminal of the tri-state gate TG2 is coupled to the input terminal of the buffer Buf, an output terminal of the tri-state gate TG2 is coupled to the control terminals of the switches SW4 and SW5, and an enable control terminal of the tri-state gate TG2 is coupled to the input terminal of the NOT gate NG2.

Moreover, exemplarily taking the compensation circuits $CC_n$ (n=451-900) of the sub-compensation unit SCU2 as an example, the input terminal of the buffer Buf is used for receiving a corresponding scan signal $S_n$ (n=451-900). The input terminal of the NOT gate NG1 is coupled to the input terminal of the buffer Buf. The first terminal of the switch SW1 is coupled to the output terminal of the buffer Buf, the second terminal of the switch SW1 is coupled to a corresponding scan line $G_n$ (n=451-900) in the display panel 201, and the control terminal of the switch SW1 is coupled to the output terminal of the NOT gate NG1. The first terminal of the switch SW2 is coupled to the output terminal of the buffer Buf, and the second terminal of the switch SW2 is coupled to the line resistance LR3. The first terminal of the switch SW3 is coupled to the second terminal of the switch SW1, and the second terminal of the switch SW3 is coupled to the line resistance LR3. The first terminal of the switch SW4 is coupled to the output terminal of the buffer Buf, and the second terminal of the switch SW4 is coupled to the line resistance LR4. The first terminal of the switch SW5 is coupled to the second terminal of the switch SW1, and the second terminal of the switch SW5 is coupled to the line resistance LR4. The input terminal of the NOT gate NG2 is used for receiving an external configuration signal $E_n$ (n=451-900). The input terminal of the tri-state gate TG1 is coupled to the input terminal of the buffer Buf, the output terminal of the tri-state gate TG1 is coupled to the control terminals of the switches SW2 and SW3, and the enable control terminal of the tri-state gate TG1 is coupled to the output terminal of the NOT gate NG2. The input terminal of the tri-state gate TG2 is coupled to the input terminal of the buffer Buf, the output terminal of the tri-state gate TG2 is coupled to the control terminals of the switches SW4 and SW5, and the enable control terminal of the tri-state gate TG2 is coupled to the input terminal of the NOT gate NG2.

According to the foregoing description, two line resistances of different resistance values are in each of the sub-compensation units SCU1 and SCU2 according to the third embodiment. In other words, the sub-compensation unit SCU1 has line resistances LR1 and LR2 of two different resistance values inside, whereas the sub-compensation unit SCU2 has line resistances LR3 and LR4 of two different resistance values inside. Accordingly, in the third embodiment, by merely adjusting a logic state of the external configuration signal $E_n$ (n=1-900), the enabling of the tri-state gates TG1 and TG2 is controlled through the NOT gate NG2, such that a transmission path traveled by the scan signal $S_n$ (n=1-900) can reflect the logic state of the external configuration signal $E_n$ (n=1-900), and thereby the scan signal $S_n$ (n=1-900) is transmitted to the corresponding scan line $G_n$ (n=1-900) in the display panel 201.

For example, when the logic state of the external configuration signal $E_1$ of the compensation circuit $CC_1$ is logic high, then the tri-state gate TG1 is disabled, whereas the tri-state gate TG2 is enabled. Consequently, when the scan signal generating unit 301 outputs the scan signal $S_1$ through the output channel $OUT_1$, since the logic state (logic high) of the input terminal of the NOT gate NG1 of the compensation circuit $CC_1$ is dissimilar to the logic state (logic low) of the output terminal thereof, the switches SW1-SW3 are turned off, whereas the switches SW4 and SW5 are turned on. Accordingly, the scan signal $S_1$ outputted by the output channel $OUT_1$ is first buffered by the buffer Buf, then subsequently transmitted to the scan line $G_1$ of the display panel 201 through the switch SW4, the line resistance LR2, and the switch SW5, thereby turning on the scan line $G_1$ until the scan signal generating unit 301 outputs the scan signal $S_2$ through the output channel $OUT_2$.

On the other hand, when the logic state of the external configuration signal $E_1$ of the compensation circuit $CC_1$ is logic low, then the tri-state gate TG1 is enabled, whereas the tri-state gate TG2 is disabled. Consequently, when the scan signal generating unit 301 outputs the scan signal $S_1$ through the output channel $OUT_1$, since the logic state (logic high) of the input terminal of the NOT gate NG1 of the compensation circuit $CC_1$ is dissimilar to the logic state (logic low) of the output terminal thereof, the switches SW1, SW4, and SW5 are turned off, whereas the switches SW2 and SW3 are turned on. Therefore, the scan signal $S_1$ outputted by the output channel $OUT_1$ is first buffered by the buffer Buf, then subsequently transmitted to the scan line $G_1$ of the display panel 201 through the switch SW2, the line resistance LR1, and the switch SW3, thereby turning on the scan line $G_1$ until the scan signal generating unit 301 outputs the scan signal $S_2$ through the output channel $OUT_2$. Since the detailed operation of the other compensation circuits $CC_n$ (n=2-450) in the sub-compensation unit SCU1 may be derived from the above description, further explanation thereof is omitted hereafter.

Similarly, when the logic state of the external configuration signal $E_{900}$ of the compensation circuit $CC_{900}$ is logic high, then the tri-state gate TG1 is disabled, whereas the tri-state gate TG2 is enabled. Consequently, when the scan signal generating unit 301 outputs the scan signal $S_{900}$ through the output channel $OUT_{900}$, since the logic state (logic high) of the input terminal of the NOT gate NG1 of the compensation circuit $CC_{900}$ is dissimilar to the logic state (logic low) of the output terminal thereof, the switches SW1-SW3 are turned off, whereas the switches SW4 and SW5 are turned on. Therefore, the scan signal $S_{900}$ outputted by the output channel $OUT_{900}$ is first buffered by the buffer Buf, then subsequently transmitted to the scan line $G_{900}$ of the display panel 201 through the switch SW4, the line resistance LR4, and the switch SW5, thereby turning on the scan line $G_{900}$ until the scan signal generating unit 301 again outputs the scan signal $S_1$ through the output channel $OUT_1$ (e.g., a next frame period).

On the other hand, when the logic state of the external configuration signal $E_{900}$ of the compensation circuit $CC_{900}$ is logic low, then the tri-state gate TG1 is enabled, whereas the tri-state gate TG2 is disabled. Consequently, when the scan signal generating unit 301 outputs the scan signal $S_{900}$ through the output channel $OUT_{900}$, since the logic state (logic high) of the input terminal of the NOT gate NG1 of the compensation circuit $CC_1$ is dissimilar to the logic state (logic low) of the output terminal thereof, the switches SW1, SW4, and SW5 are turned off, whereas the switches SW2 and SW3 are turned on. Therefore, the scan signal $S_{900}$ outputted by the output channel $OUT_{900}$ is first buffered by the buffer Buf, then subsequently transmitted to the scan line $G_{900}$ of the display panel 201 through the switch SW2, the line resistance LR3, and the switch SW3, thereby turning on the scan line $G_{900}$ until the scan signal generating unit 301 again outputs the scan signal $S_1$ through the output channel $OUT_1$ (e.g., a next frame period). Since the detailed operation of the other compensation circuits $CC_n$ (n=451-899) in the sub-compensation unit SCU2 may be derived from the above description, further explanation thereof is omitted hereafter.

Accordingly, during a mass production process and before product shipment of the liquid crystal display 1000 according to the third embodiment, the liquid crystal display 1000 merely needs the resistance values of the line resistances LR1-LR4 determined according to an actual design requirement, and the logic state of the external configuration signal $E_n$ received by each of the compensation circuits set. Therefore, similar to the first and second embodiments, the layout resistance variation between each of the output channels $OUT_n$ of the gate driver 1003 and the display panel 201 may be drastically reduced (e.g., may only be tens of ohms left). Moreover, compared to the second embodiment, the gate driver 1003 according to the third embodiment may have more configurable design options than the gate driver 603 according to the second embodiment.

To summarize the foregoing description, each of the switches and the control signals thereof (e.g., at least an external configuration signal and/or the scan signal) in the compensation units 303, 703, and 1103 of the embodiments above may be viewed as a switching means. Moreover, the resistors and line resistances in the compensation units 303, 703, and 1103 of the embodiments above may be viewed as a resistance-supply means. That is to say, as long as similar switching means and resistance-supply means are combined and integrated in a gate driver, such that the total resistance of each of the output channels is compensated, then these mechanisms/means/techniques falls within the scope of the invention.

In light of the foregoing, by employing the switching means and the resistance-supply means therein, the gate driver according to an embodiment of the invention lowers the layout resistance between each of the output channels of the gate driver and the display panel. Accordingly, the variation of the scan signal outputted by each of the output channels of the gate driver is reduced, and the possibility of the "multi-band phenomenon" occurring on the display panel in the description of the related art is lowered, thereby enhancing the quality of images displayed by the display panel.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A gate driver, comprising:

a scan signal generating unit having a plurality of output channels, used for sequentially outputting a scan signal through the output channels according to a basic clock and a start pulse; and a compensation unit coupled to the output channels, used for compensating a total resistance of each of the output channels through a buffering means, a switching means and a resistance-supply means, and sequentially receiving and transmitting the scan signal to a display panel, wherein the buffering means comprises at least one buffer, wherein the switching means comprises a combination of at least one switch and at least one digital logic gate, wherein the resistance-supply means comprises at least one line resistance, wherein the compensation unit comprises a first sub-compensation unit coupled to a portion of the output channels, and wherein the first sub-compensation unit comprises:

a first line resistance;

a second line resistance; and a plurality of first compensation circuits respectively corresponding to the portion of the output channels, each of the first compensation circuits comprising:

a first buffer having an input terminal used for receiving the corresponding scan signal;

a first NOT gate having an input terminal coupled to the input terminal of the first buffer;

a first switch having a first terminal coupled to an output terminal of the first buffer a second terminal coupled to the display panel, and a control terminal coupled to an output terminal of the first NOT gate;

a second switch having a first terminal coupled to the output terminal of the first buffer, and a second terminal coupled to the first line resistance; a third switch having a first terminal coupled to the second terminal of the first switch, and a second terminal coupled to the first line resistance;

a fourth switch having a first terminal coupled to the output terminal of the first buffer, and a second terminal coupled to the second line resistance;

a fifth switch having a first terminal coupled to the second terminal of the first switch, and a second terminal coupled to the second line resistance;

a second NOT gate having an input terminal used for receiving a first external configuration signal;

a first tri-state gate having an input terminal coupled to the input terminal of the first buffer, an output terminal coupled to control terminals of the second and third switches, and an enable terminal coupled to the output terminal of the second NOT gate; and a second tri-state gate having an input terminal coupled to the input terminal of the first buffer, an output terminal coupled to control terminals of the fourth and fifth switches, and an enable terminal coupled to the input terminal of the second NOT gate.

2. The gate driver as claimed in claim 1, wherein the compensation unit further comprises:

a second sub-compensation unit coupled to a remaining portion of the output channels, the second sub-compensation unit comprising:

a third line resistance;

a fourth line resistance; and a plurality of second compensation circuits respectively corresponding to the remaining portion of the output channels, each of the second compensation circuits comprising:

a second buffer having an input terminal used for receiving the corresponding scan signal;

a third NOT gate having an input terminal coupled to the input terminal of the second buffer;

a sixth switch having a first terminal coupled to an output terminal of the second buffer, a second terminal coupled to the display panel, and a control terminal coupled to the output terminal of the third NOT gate;

a seventh switch having a first terminal coupled to the output terminal of the second buffer, and a second terminal coupled to the third line resistance;

an eighth switch having a first terminal coupled to the second terminal of the sixth switch, and a second terminal coupled to the third line resistance;

a ninth switch having a first terminal coupled to the output terminal of the second buffer, and a second terminal coupled to the fourth line resistance;

a tenth switch having a first terminal coupled to the second terminal of the sixth switch, and a second terminal coupled to the fourth line resistance;

a fourth NOT gate having an input terminal used for receiving a second external configuration signal;

a third tri-state gate having an input terminal coupled to the input terminal of the second buffer, an output terminal coupled to control terminals of the seventh and eighth switches, and an enable terminal coupled to an output terminal of the fourth NOT gate; and a fourth tri-state gate having an input terminal coupled to the input terminal of the second buffer, an output terminal coupled to control terminals of the ninth and tenth switches, and an enable terminal coupled to the input terminal of the fourth NOT gate.

3. The gate driver as claimed in claim 2, wherein the resistance values of the first and second line resistances are substantially different, and the resistance values of the first and third line resistances are substantially the same.

4. The gate driver as claimed in claim 2, wherein the resistance values of the third and fourth line resistances are substantially different, and the resistance values of the second and fourth line resistances are substantially the same.

5. The gate driver as claimed in claim 1, wherein a wiring distance from each of the output channels to the display panel is different.

6. The gate driver as claimed in claim 5, wherein a layout resistance between each of the output channels and the display panel is different.

7. A liquid crystal display having the gate driver as claimed in claim 1.

8. A gate driver, comprising:

a scan signal generating unit having a plurality of output channels, used for sequentially outputting a scan signal through the output channels according to a basic clock and a start pulse; and a compensation unit coupled to the output channels and comprising a buffering means, a switching means and a resistance-supply means, the compensation unit being used for respectively providing a compensation resistance to compensate a total resistance of each of the output channels through the buffering means, the switching means and the resistance-supply means according to at least an external configuration signal and/or the scan signal, and sequentially receiving and transmitting the scan signal to a display panel, wherein the buffering means comprises at least one buffer, wherein the switching means comprises a combination of at least one switch and at least one digital logic gate, wherein the resistance-supply means comprises at least one line resistance, wherein the compensation unit comprises a first sub-compensation unit coupled to a portion of the output channels, and wherein the first sub-compensation unit comprises:

a first line resistance;

a second line resistance; and a plurality of first compensation circuits respectively corresponding to the portion of the output channels, each of the first compensation circuits comprising:

a first buffer having an input terminal used for receiving the corresponding scan signal;

a first NOT gate having an input terminal coupled to the input terminal of the first buffer;

a first switch having a first terminal coupled to an output terminal of the first buffer, a second terminal coupled to the display panel, and a control terminal coupled to an output terminal of the first NOT gate;

a second switch having a first terminal coupled to the output terminal of the first buffer, and a second terminal coupled to the first line resistance; a third switch having a first terminal coupled to the second terminal of the first switch, and a second terminal coupled to the first line resistance;

a fourth switch having a first terminal coupled to the output terminal of the first buffer, and a second terminal coupled to the second line resistance;

a fifth switch having a first terminal coupled to the second terminal of the first switch, and a second terminal coupled to the second line resistance;

a second NOT gate having an input terminal used for receiving a first external configuration signal;

a first tri-state gate having an input terminal coupled to the input terminal of the first buffer, an output terminal coupled to control terminals of the second and third switches, and an enable terminal coupled to the output terminal of the second NOT gate; and a second tri-state gate having an input terminal coupled to the input terminal of the first buffer, an output terminal coupled to control terminals of the fourth and fifth switches, and an enable terminal coupled to the input terminal of the second NOT gate.

9. The gate driver as claimed in claim 8, wherein the compensation unit further comprises:

a second sub-compensation unit coupled to a remaining portion of the output channels, the second sub-compensation unit comprising:

a third line resistance;

a fourth line resistance; and a plurality of second compensation circuits respectively corresponding to the remaining portion of the output channels, each of the second compensation circuits comprising:

a second buffer having an input terminal used for receiving the corresponding scan signal;

a third NOT gate having an input terminal coupled to the input terminal of the second buffer;

a sixth switch having a first terminal coupled to an output terminal of the second buffer, a second terminal coupled to the display panel, and a control terminal coupled to the output terminal of the third NOT gate;

a seventh switch having a first terminal coupled to the output terminal of the second buffer, and a second terminal coupled to the third line resistance;

an eighth switch having a first terminal coupled to the second terminal of the sixth switch, and a second terminal coupled to the third line resistance;

a ninth switch having a first terminal coupled to the output terminal of the second buffer, and a second terminal coupled to the fourth line resistance;

a tenth switch having a first terminal coupled to the second terminal of the sixth switch, and a second terminal coupled to the fourth line resistance;

a fourth NOT gate having an input terminal used for receiving a second external configuration signal;

a third tri-state gate having an input terminal coupled to the input terminal of the second buffer, an output terminal coupled to control terminals of the seventh and eighth switches, and an enable terminal coupled to an output terminal of the fourth NOT gate; and a fourth tri-state gate having an input terminal coupled to the input terminal of the second buffer, an output terminal coupled to control terminals of the ninth and tenth switches, and an enable terminal coupled to the input terminal of the fourth NOT gate.

* * * * *